United States Patent
Pipkorn

[11] Patent Number: 5,173,098
[45] Date of Patent: Dec. 22, 1992

[54] WIRE FILTER CAGE

[75] Inventor: Howard W. Pipkorn, Arden Hills, Minn.

[73] Assignee: Pipkorn Environmental Technologies, Inc., Minneapolis, Minn.

[21] Appl. No.: 809,679

[22] Filed: Dec. 18, 1991

[51] Int. Cl.$^5$ ............................................. B01D 46/04
[52] U.S. Cl. .................................... 55/379; 55/294; 55/302; 55/492
[58] Field of Search ............... 55/294, 302, 304, 379, 55/492, 517

[56] References Cited

U.S. PATENT DOCUMENTS

| | | | |
|---|---|---|---|
| 3,016,984 | 1/1962 | Getzin | 55/492 |
| 3,385,573 | 5/1968 | Gilman | 55/517 X |
| 3,487,609 | 1/1970 | Caplan | 55/294 X |
| 3,747,307 | 7/1973 | Peshina et al. | 55/379 |
| 3,853,509 | 12/1974 | Leliaert | 55/379 X |
| 4,292,057 | 9/1981 | Ulvestad et al. | 55/302 |
| 4,293,111 | 10/1981 | Henri | 55/379 X |
| 4,878,926 | 11/1989 | Goodrich | 55/294 |

Primary Examiner—Charles Hart
Attorney, Agent, or Firm—Patterson & Keough

[57] ABSTRACT

A wire frame assembly for supporting an air filtration bag includes two wire form sections detachably coupled at a frame junction. Each frame section includes a plurality of wire elements extending along the length thereof, and presenting ends terminating at the frame junction. A generally annular ring is carried by one of the frame sections at the frame junction, with the ring protruding outwardly beyond the periphery of the frame assembly. The air filtration bag is accordingly isolated from coming into contact with the sharp wire element ends.

8 Claims, 3 Drawing Sheets

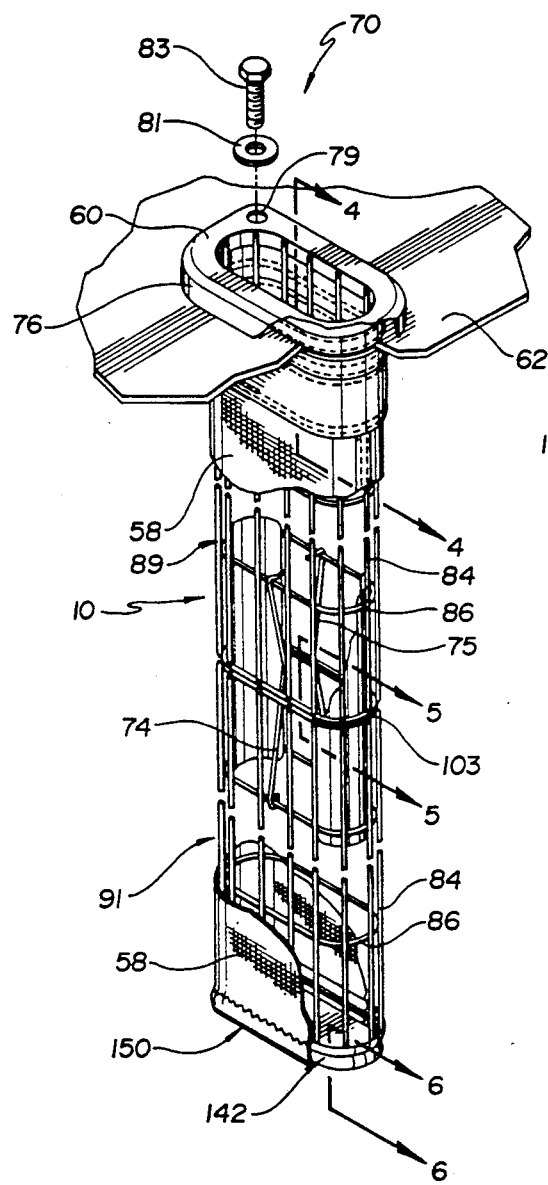
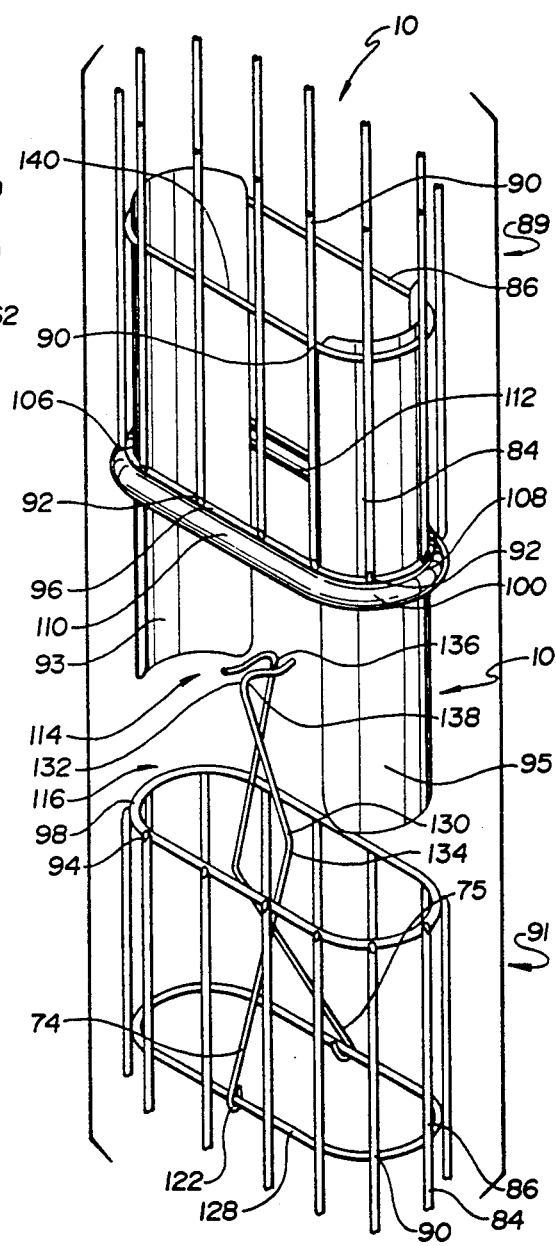
Fig.2
Fig.3

WIRE FILTER CAGE

FIELD OF THE INVENTION

The present invention relates to an air filtration system suitable for use within the ventilation system of buildings. More particularly, the invention relates to improved filter cages used for supporting elongated filtration bags or socks within such filtration systems.

BACKGROUND OF THE INVENTION

Air filtration systems utilized in large ventilation systems in, for instance, buildings and power plants, often employ banks of elongated filtration bags or socks supported by wire filter cage assemblies. The filtration bags remove particulates from the air circulated through the bag. Due to the length of the wire filter cages, the filter cages are generally formed of two distinct sections which are fitted together, forming an elongate structure. A pair of clamps or hooks securely join the two sections on the outside surface of the wire filter cage. Air permeable filtration bags are positioned over the filter cages. The wire filter cages support the bags, and prevent the bags from collapsing as air is sucked through the bags. Particulates in the air accumulate on the outside of the bags as air is drawn through the bag and filter cage combination.

Drawing air through each bag from the outside to the interior allows for ease in cleaning accumulated particulates off of the bags. In particular, particulates can be removed by shaking the bag, or providing a ripple impulse to the bag, such that particulates simply fall off.

When the two sections of the wire filter cage are joined, the longitudinal wires of each section do not necessarily line up, but rather can be in a staggered configuration. As a result, the terminal ends of the longitudinal wires, which can be sharp and jagged, can be exposed at the junction of the two sections of the wire filter cage. The sharp or jagged ends of the wires can be filed or smoothed, but this is very labor intensive, with a marked increase in cost. The filter bags which are used in such a ventilation system are fragile and easily torn, and there is a danger that the filter bags will come in contact with the sharp or jagged edges of the wires at the junction of the two-part wire filter assembly, particularly during installation. The filter bags can accordingly often tear, rip, or run, rendering the filtration device less effective. Since a typical air filtration system may utilize in excess of twenty thousand filter cages and filter bags, ineffective filtration as a result of the damaged filter bags can cause a significant problem.

SUMMARY OF THE INVENTION

The present invention discloses a two section wire filtration cage assembly used in large capacity air filtration systems which simply, effectively, and economically solves the above noted problems. A unique, generally annular ring is positioned at the junction of the two separate sections of the wire filter cage. The annular ring isolates the sharp, terminal ends of the longitudinal wires forming the wire filter cage from coming into contact with the filter bags supported by the cage by acting as a protruding barrier between the filter bag and the wire filter cage. Ripping or tearing of the fragile filter bags is accordingly avoided without having to finish the ends of the wires forming the filter cage. Hooks or clamps are utilized to securely join the two sections of the wire filter cage together.

BRIEF DESCRIPTION OF THE DRAWINGS

FIG. 2 is a fragmentary perspective view of the improved wire filter cage in accordance with the present invention;

FIG. 3 is a fragmentary, exploded detail view of the junction between sections of the wire cage;

DETAILED DESCRIPTION OF THE INVENTION

Figure 1:
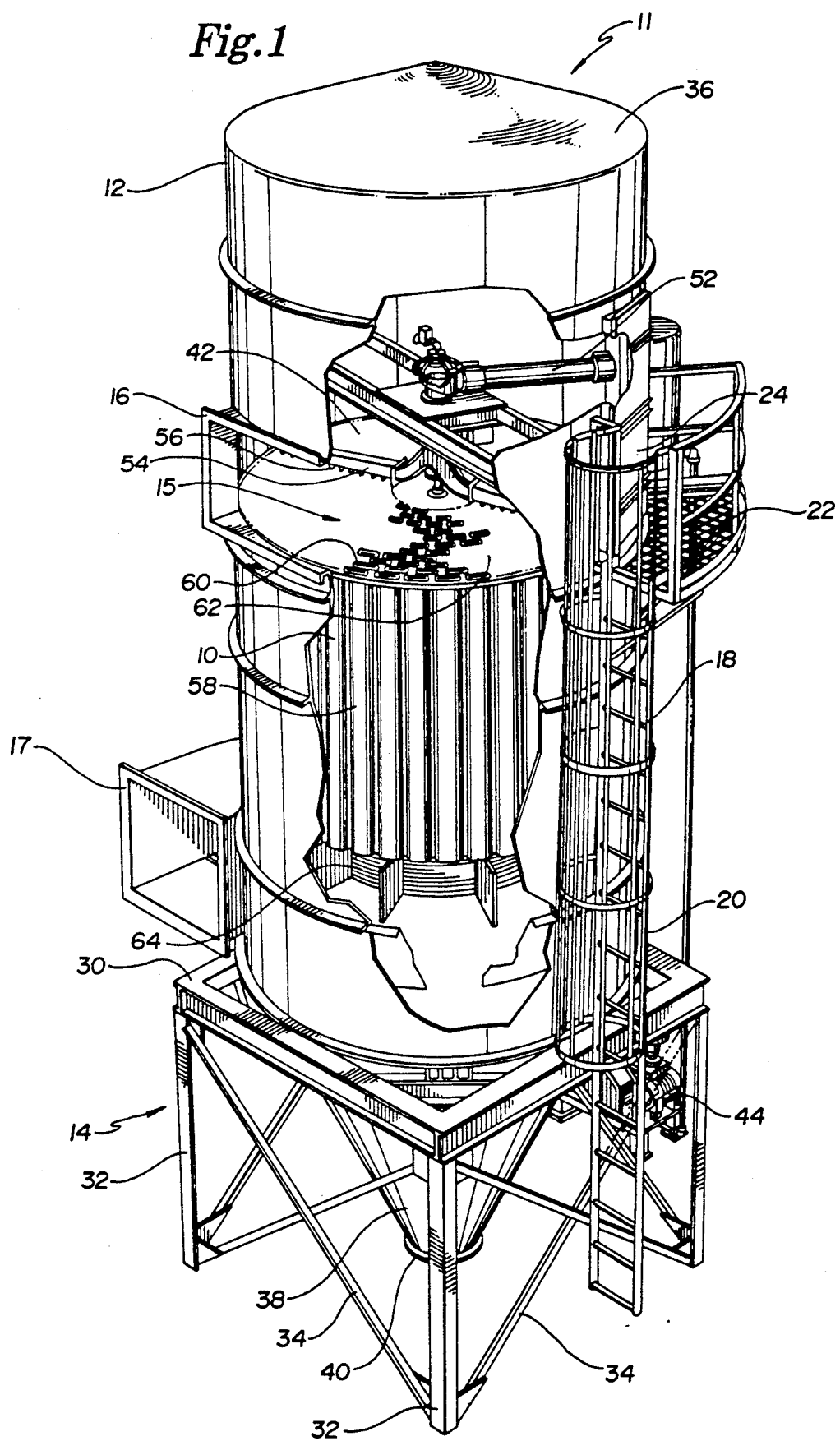
FIG. 1 is a perspective view of a large scale air filtration system, with parts cut away for clarity, and having a plurality of improved wire filter cages in accordance with the present invention installed therein.

Referring to FIG. 1, a plurality of improved wire filter cages 10 in accordance with the present invention are depicted as installed in a ventilation system 11. The ventilation system 11 broadly includes plenum enclosure 12, base frame 14, air filtration system 15, filtered exhaust duct 16, and air intake 17. Ventilation system 11 is utilized, for instance, in power or nuclear plants and buildings where refining operations may take place, and may range in height from fifty to one hundred feet. An access ladder 18, surrounded by cage 20, leads up to cat walk 22, providing access to plenum enclosed 12 through access door 24. Filtered exhaust duct 16 and air intake duct 17 are attached to and integral with plenum enclosure 12. Air filtration system 15 is positioned within plenum chamber 42. Plenum enclosure 12 is positioned on base 14.

Base 14 includes base frame 30, base legs 32, and braces 34. Base 14 can vary in size and proportion, depending on the size of the plenum enclosure 12 to be supported on base 14. Base 14 can be made of a variety of high strength, durable materials.

Plenum enclosure 12 is a large, generally cylindrical structure, ranging from twenty-five to fifty feet in height. Plenum cover or roof 36 is positioned over plenum enclosure 12. Dust collection funnel 38 tapers downwardly toward dust discharge mouth 40. The funnel 38 is positioned underneath plenum enclosure 12, residing within the space below base frame 30 and between base legs 32 and braces 34.

Large capacity air filtration system 15 is contained mainly within plenum chamber 42. Air filtration system 15 broadly includes air pressure pump 44, pressurization nozzle input duct 52, nozzle arm 54, and numerous air permeable hanging filter media bags or socks 58 surrounding wire filter cages 10. In a typical large capacity air filtration system 15, employing multiple enclosures 12, as many as twenty thousand filter bags 58 and twenty thousand wire filter cages 10 may be utilized.

Air pressure pump 44 is connected to suction nozzle duct 52. Nozzle arm 54 is positioned beneath suction nozzle duct 52, and has bag suction nozzles 56 opening in a downwardly direction, directed toward bag mouths 60 of wire cage assemblies 70.

Hanging filter media bags or socks 58 are supported by bag mouths 60. Bag mouths 60 are positioned below bag suction nozzles 56. Bag mouths 60 rest on and are supported by bag hanger deck 62. Filter media bags 58 are positioned over and supported by wire filter cages 10. Unfiltered air enters ventilation system 11 through raw air intake duct 17 so as to be processed through air filtration system 15. Filtered air is expelled from ventilation system 11 through filtered exhaust duct 16.

Figure 4:
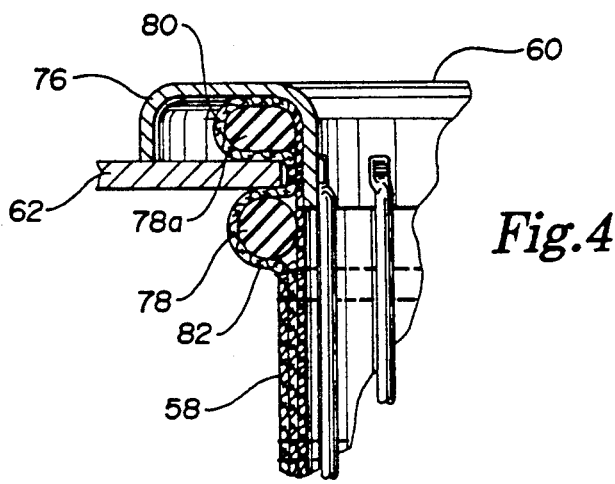
FIG. 4 is a fragmentary sectional view taken along line 4—4 of FIG. 2.

Referring now to FIG. 2, wire cage assembly 70 is shown in detail. Wire cage assembly 70 broadly comprises bag mouth 60, wire cage 10, air permeable media filtration sock or filter bag 58, and hooks or clamps 74, 75. As can best be seen in FIG. 2 and FIG. 4, bag mouth rim 76 is positioned over and sits on bag hanger deck 62. Bag mouth 60 and filter bag 58 are held in position against bag hanger deck 62 by O-rings 78, 78a which are positioned inside over-deck bead 80 and under-deck bead 82 of bag 58. O-rings 78, 78a snap into place so as to restrain filter bag 58 and provide a tight seal, so that no particulate or filtered matter enters plenum chamber 42. Bag mouth 60 is securely fastened to bag hanger deck 62 through mounting hole 79 using washer 81 and bolt 83.

Referring now to FIG. 3, it can be seen that wire cage 10 has a generally oval shape in cross section and comprises longitudinal wires 84 and horizontal form wires 86 at defined spaced intervals. Longitudinal wires 84 and horizontal wires 86 utilize a durable, rigid, malleable metal wire. Since wire cage 10 can be ten or more feet in length, wire cage 10 is comprised of two separate sections 89, 91, as can be seen in FIG. 3. Longitudinal wires 84 and horizontal form wires 86 are joined at welded junctions 90. terminal ends 92, 94 of longitudinal wires 84 are welded onto form wires 96, 98.

As shown in FIGS. 2 and 3, the upper section 89 of wire cage 10 is joined to the lower section 91 of wire cage 10 by fairlead tongues 93, 95 carried within the interior of section 91. Fairlead tongues 93, 95 are received within lower section 91 in a friction fit when sections 89, 91 are joined, and are securely fastened together by hooks 74, 75.

Figure 5:
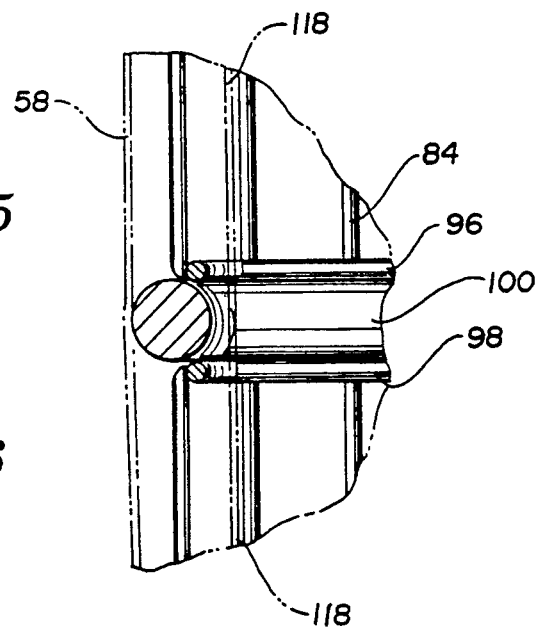
FIG. 5 is a fragmentary sectional view thereof taken along line 5—5 of FIG. 2.

As can best be seen in FIGS. 3 and 5, junction ring 100 is carried below form wire 96 on section 89 of wire cage 10. Ring 100 is generally circular in cross section and comprises a generally annular ring carried by fairlead tongues 93, 95. More particularly, ring 100 includes first arcuate end 106, second arcuate end 108, and parallel rods 110, 112 extending therebetween. Ring 100 can be made of the same metal material utilized for horizontal wires 86 and longitudinal wires 84. Ring 100 has a diameter several times larger than the diameter of form wire 96 or primary form wire 98 on sections 89, 91 of wire cage 10. As a result, ring wire 100 protrudes from the plane of wire cage 10 at the junction 103 of primary form wire 98 and form wire 96, and acts as a spatial barrier between filter media bag 58 and wire cage 10, reducing the likelihood of filter bag 58 coming into contact with terminal ends 92, 94 of longitudinal wires 84 of wire cage 10.

Hooks 74, 75 are essentially the same, so only hook 74 will be discussed in detail. Hook 74 includes lowermost hook hinge 122 snapably received by intermediate wire 128 of cage section 91, intermediate portion 130, and uppermost snap element 132. As can best be seen in FIG. 3, intermediate portion 130 is carried within the interior of cage 10, and is angled at its approximate midpoint 134. Snap element 132 is formed to present a leading guide portion 136 and an engagement portion 138 for selectively, snapably engaging intermediate wire 140 of wire cage section 89.

Figure 6:
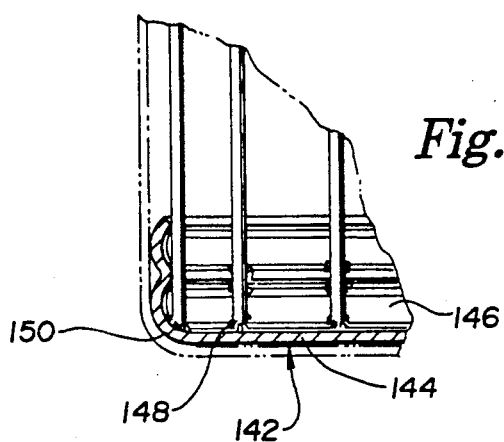
FIG. 6 is a fragmentary sectional view taken along line 6—6 of FIG. 2.

As can best be seen in FIGS. 2 and 6, wire cage 10 terminates in bottom cap 142 at one end of section 91 of wire cage 10. Bottom cap 142 consists of planer bottom wall surface 144 and sidewall surface 146. Longitudinal wires 84 are welded to bottom cap 142 on the bottom wall surface 144 and sidewall surface 156. Bottom cap 142 has a generally oval shape. Bottom cap 142 encapsulates terminal ends 148 of longitudinal wires 84 to prevent contact of the filter bag 58 with the terminal ends 148. As can be seen in FIG. 6, filter bag 58 is double hemmed at the bag tip 150.

Figure 7:
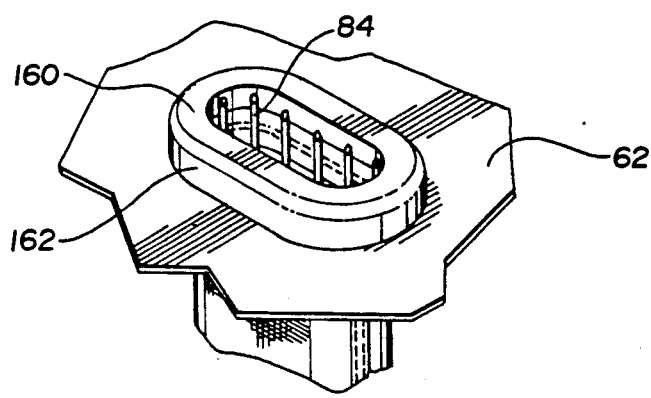
FIG. 7 is a fragmentary perspective view of an alternate form of the mouth of a filter bag as supported by the cage and bag hanger deck.

Referring now to FIG. 7, another embodiment of bag mouth 160 is illustrated. In FIG. 7, bag mouth 160 is positioned on section 91 of wire cage 10 such that longitudinal wires 84 terminate below the surface of mouth rim 162. Bag mouth 160 is positioned on bag hanger deck 62, and is simply pressed into place and engages with bag hanger deck 62 by friction. No bolt is utilized to hold bag mouth 160 to bag hanger deck 62.

In operation, sections 89 and 91 of wire cage 10 are joined together by inserting the fairlead tongues 93, 95 of section 89 into the interior of section 91. The hook hinges 122 of hook 74, 75 are carried by intermediate wire 128 of cage section 91. The snap elements 132 of hooks 74, 75 are slid over intermediate wire 140 of upper cage section 89. With reference to FIG. 3, it will be appreciated that the terminal ends of hook hinges 122 and snap elements 132 are directed inwardly of the wire cage 10, such that no jagged edges are presented by the hook 74, 75 in a position that could engage the filter bag 58. Moreover, the angling of the intermediate portion 130 of hooks 74, 75 at their approximately midpoint 134 is specifically designed to keep the profile of the hooks 74, 75 within the interior of wire cage 10. Since the diameter of the hooks 74, 75 is less than, or possibly the same diameter as, the diameter of the wires making up the cage 10, no portion of the hooks 74, 75 extends outwardly beyond the profile of the cage 10.

With the wire cage 10 fully assembled, a filter bag 58 can be slid over the cage 10 for installment of the combined cage and bag assembly onto the bag hanger deck 62 of plenum enclosure 12. The bag 58 is isolated from the jagged internal ends of longitudinal wires 90 at the lowermost end of cage 10 by cap 130, at the uppermost end of cage 10 by mouth 60, and at the intermediate, junction portion of cage 10 by ring 100. In particular, because the diameter of the ring 100 is greater than the diameter of the wires 90, 92 and because the terminal ends of the wires 90 at the junction point of wire cage 10 generally abut against the wire ring 100, the bag 58 is prevented from coming into contact with the jagged internal ends of the wires 90.

Air pressure pump 44 is activated when the system is fully assembled, such that air is drawn and directed in an upwardly direction from sock pressurization nozzles 56, through nozzle arm 54 toward pressurization nozzle input duct 52. Unfiltered air is accordingly drawn into raw air intake 17. The unfiltered air enters air filtration system 15 through air intake 17, and is sucked through the exterior surface to the interior of filter bags 58. Filter bags 58 are held open and kept from collapsing by wire filter cages 10 as the air is drawn through air filtration system 15. The filtered particulates, such as fly ash, adhere to and remain on filter socks 58, and the filtered air passes through wire form filtration assembly 70, exiting through bag mouth 60, and is expelled through filtered exhaust 16. As the air pressure differential created by air pressure pump 44 is reduced, the particles and particulates which have adhered to filter media bags 58 will fall from the external surface of the bags 58. The bags 58 can be shaken or subjected to a ripple impulse, forcing particulates to fall off of the filter bags 58 and proceed to the bottom of plenum chamber 42, for disposal.

The above described embodiment is an example of a filtration system utilizing the present invention, but is in no way to limit the types of air filtration systems which are within the contemplation of the present invention.

I claim:

1. A wire frame assembly for supporting a filter bag or the like, comprising:
   a first section having a first section junction end and a plurality of wire elements extending generally along the length thereof, presenting a first section external periphery, said wire elements presenting generally sharp ends terminating at said first section junction end generally in the plane of said first section external periphery;
   a second section having a second section junction end and a plurality of wire elements extending generally along the length thereof defining a second section external periphery, said wire elements presenting generally sharp ends terminating at said second section junction end generally in the plane of said second section external periphery, said first and second sections being adapted for operably, detachably coupling to each other at said first and second junction ends to present a frame junction; and
   ring means operably carried by said first section junction end for isolating said filter bag from contact with said first section and second section generally sharp wire element ends when said first and second sections are coupled together to present said junction,
   said first section external periphery and said second section external periphery presenting a wire frame external periphery, said ring means presenting a bag engaging surface outwardly from said frame external periphery whereby said bag is carried by said wire frame assembly spaced apart from said generally sharp wire element ends at said junction.

2. The invention as claimed in claim 1, said first section including a pair of opposed tongue members for engageably receiving said second section, said ring means being operably carried by said tongue means.

3. The invention as claimed in claim 1, including hook means for selectively, snapably coupling said first and second sections together, said hook means including first engagement means for engaging said first section, second engagement means for engaging said second section, and coupling means extending between said first and second engagement means along the interior of said wire frame assembly for coupling said first and second engagement means.

4. The invention as claimed in claim 1, said ring means comprising a generally annular, circular in cross section ring member carried by said first section junction, said ring member presenting an exterior surface generally abutting the ends of said first section wire elements.

5. The invention as claimed in claim 4, wherein said ring member generally abuts said ends of said second section wire elements when said first section and said second section of said wire frame assembly are operably coupled together.

6. The invention as claimed in claim 3, further comprising a second section intermediate wire spaced apart from said second section junction end, and wherein said second engagement means further comprises a hook hinge which is operably received about said second section intermediate wire.

7. The invention as claimed in claim 6, further comprising a first section intermediate wire spaced apart from said first section junction end, and wherein said first engagement means comprises a leading guide portion and an engagement portion for snapably engaging said first section intermediate wire.

8. The invention as claimed in claim 7, wherein said coupling means comprises first and second portions oriented at an angle to each other to form an angled coupling element for biased coupling engagement of said first and second sections.

* * * * *